July 9, 1963
H. A. KONOPACKE ETAL
FILM EXTRUSION APPARATUS HAVING IMPROVED
FILM THICKNESS CONTROL MEANS
3,096,543
Filed March 8, 1962
2 Sheets-Sheet 1
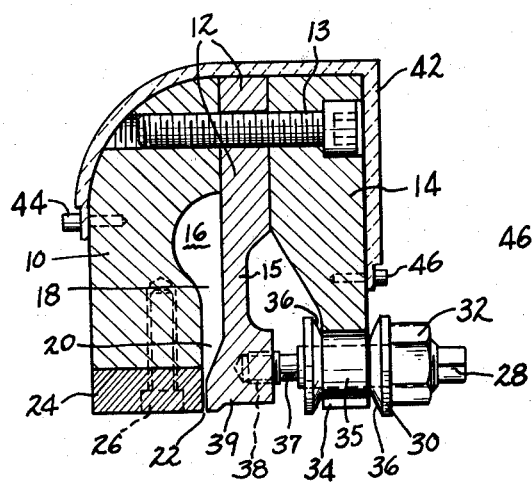
FIG - 1
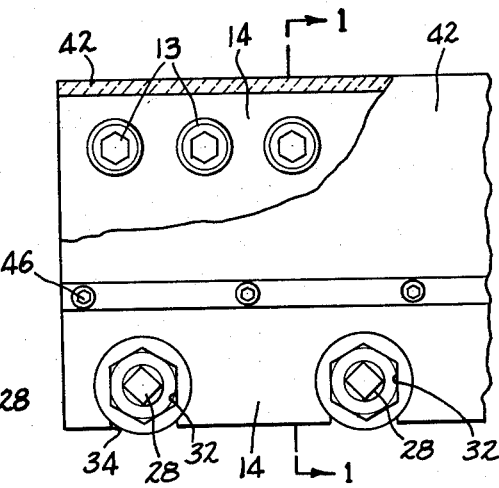
FIG - 2
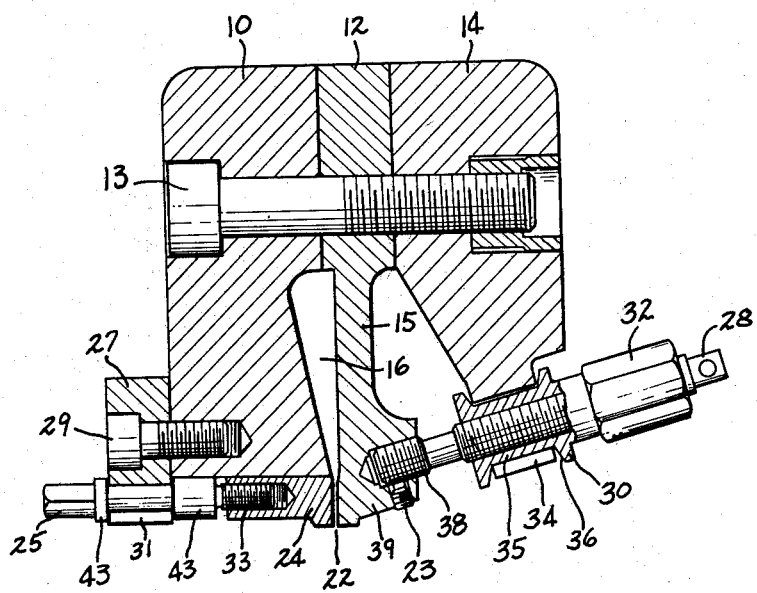
FIG - 3
INVENTORS:
HENRY A. KONOPACKE
JOHN C. CUNNINGHAM
BY 
ATTORNEY

United States Patent Office 3,096,543
Patented July 9, 1963

3,096,543
FILM EXTRUSION APPARATUS HAVING IMPROVED FILM THICKNESS CONTROL MEANS
Henry A. Konopacke, North Haven, and John C. Cunningham, New Haven, Conn., assignors to Olin Mathieson Chemical Corporation, New Haven, Conn., a corporation of Virginia
Filed Mar. 8, 1962, Ser. No. 178,334
5 Claims. (Cl. 18—12)

This invention relates to an improved extrusion apparatus which can be fabricated economically, assembled readily for use to provide accurate and stable control in thickness of the extruded material, and which can be disassembled for cleaning with great facility. This application is a continuation-in-part of our copending application Ser. No. 802,464 filed March 27, 1959 and now abandoned.

Dies used in the extrusion of plastic flat film at relatively high speeds are subjected to changes in internal pressure, to changes in the temperature of their members, and to mechanical fatigue and wear. As a result, the extruded film is non-uniform in the transverse direction as well as in the longitudinal direction, in which it is extruded.

An object of the subject invention is to provide extrusion apparatus capable of use in forming extruded film having substantial uniformity of thickness in its transverse and longitudinal directions. Another object is to provide such apparatus capable of producing film of uniform dimensions at relatively high rates. A further object is to provide an improved extrusion die which may be readily regulated and which is characterized by the stability of the desired setting. Still a further object is to provide a die which is economical and rugged because of the simplicity of its parts, and which is easily assembled or disassembled.

The foregoing and other objects, which will be apparent from the following detailed description, have been achieved by the provision of extrusion apparatus including a die having two fixed outer members of massive structure so as to be substantially rigid, one a die body member, and the other a support member, and secured between said two rigid members a cantilevered flexible member capable of lateral and longitudinal flexing, said latter element having a fixed end secured between the two rigid members, and having a movable end between the free ends of said rigid members, and said die having a die lip blade on the free end of the die body member confronting a die lip blade on the free end of said flexible member, and means for the control of the spacing between the fixed and movable blades.

In another of its broader aspects, the objects of this invention are achieved by providing a pair of elongated die lip surfaces in confronting relation, means for supplying an extrudable liquid to and through the region between the confronting surfaces to extrude said fluid therefrom in sheet form, said means comprising a die body formed with an elongated internal die cavity connected along its length with said region, said die body having a rigid wall structure terminating at one of said lip surfaces, and said die body having a non-rigid wall structure terminating at the other lip surface. Without other provisions, an increase in the pressure within said die cavity would tend to increase the separation of said confronting lip surfaces due to outward flexing of the non-rigid wall. However, means are provided for restricting the separative motion of said lip surfaces, comprising fulcrum support means acting on the rigid wall portion to cause an increase in the pressure exerted on the said fluid between said lip surfaces responsive to an increase in the pressure in the die cavity remote from said die lips.

In order to clarify the essential features and advantages of the present invention, reference is made to the accompanying drawings in which:

FIGURE 1 is a vertical sectional view of an extrusion die, taken along the line 1—1 of FIGURE 2.

FIGURE 2 is an elevational plan view of one face of the die shown with part of the heating jacket removed.

FIGURE 3 is a vertical sectional view of an extrusion die constituting a different embodiment.

Figure 4:
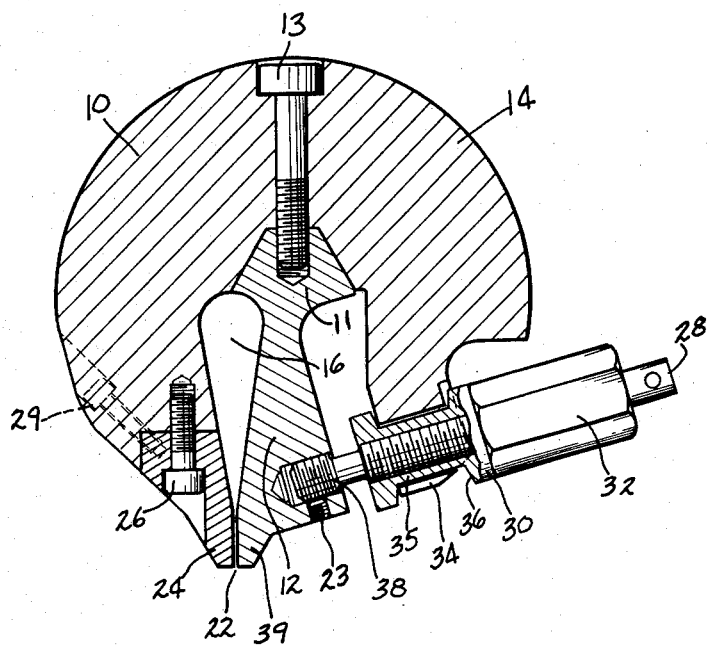
FIGURE 4 is a similar view of a further embodiment of an extrusion die in accordance with the invention.

Referring to FIGURE 1, the extrusion die illustrated consists essentially of three members, a die body 10, a flex blade 12, and a backing plate 14, the members 10 and 14 being of massive construction to impart substantial rigidity.

Suitable bolts 13, extending through the fixed ends of the three members, hold them securely together. A die cavity 16 is defined between the internal surfaces of the die body 10 and flex blade 12. An extrudable composition which enters the cavity from one or more positions along the length of the die, is forced through the die cavity 16, then through the cavity lead 18 and the throat 20 and is finally extruded through the narrow extrusion slot 22 formed between the lower extremities or lip sections of the die body and flex blade.

The lower portion of the die body 10 consists of a fixed blade 24 which is retained in position on the die body by suitable bolts 26.

One particular feature of the die construction is the adjustability of the slot 22 formed between the lip portions of the die body and flex blade. This adjustability is achieved by urging the lower free portion 39 of the flex blade toward the fixed blade lip portion 24 by suitable relative rotation of the adjusting spools 30, and the adjusting screws 28, which are firmly threaded into the flex blade 39.

The adjusting screws 28 are also retained within the adjustment spools 30, which are internally threaded and are provided with hexheads 32 on the external portion of the die.

The spools 30 are retained in the lower portion of the backing plate 14 within slots 34 which are oversize with respect to the diameter of the spool arbor 35. As a result, the curved surface of each spool flange 36 is free to find its center and to ride or adjust its position relative to the slot, responsive to axial deflections of the screw member 28.

As the adjusting spools 30 are turned to close the gap 22, a pressure is exerted between the backing plate, where it is contacted by the spool flange 36 and the stud portion 38 of screw 28 where it contacts the aforesaid flex blade end 39. Relative motion of a threaded spool and adjusting screw thus causes a greater or lesser separatory force to be exerted at the free end of the flex blade and accordingly effects an increase or decrease of the gap 22 between the lip sections of the die.

The die members are held together at their upper fixed ends by suitable bolts 13. Where necessary, the die may be heated by a heater band 42, as shown, which consists of an insulated resistance heater having a copper outer jacket, a mica insulator, and an internal resistance wire heating element. Suitable bolts 44 and 46 hold this band in place.

An essential feature of flexible blade 12 is that it can be deformed in several planes and will resume its shape on release of deforming pressure. The blade 12 illustrated in FIGURE 1 has this property due to its cantilevered support between the heavy structural elements 10 and 14, and particularly due to its height and relatively thin construction from its point of fixed support. Thus, along the length of the blade there is a relatively thin mid-section 15 which permits the lower portion of the blade to be flexed about a longitudinal axis, but in addition, and most significantly, permits the lower portion of the blade to be deformed or flexed about vertical axes at points along the length of the blade. The blade may be, in one of its preferred modes of construction, of sufficiently flexible construction to be deformed or flexed both about longitudinal axes and about vertical axes.

One of the particular advantages of the subject die construction is that the lower portion of the flexible blade is externally supported at several regions along its length. For example, with reference to FIGURE 1, such external support is provided from points of support in the element 14. The longitudinal deformation of the lower portion 39 of the blade 12 about vertical axes may be adjusted by application of a force between element 14 and the lower portion of the blade to give this lower portion a configuration which corresponds to that of the confronting rigid die lip 24. This longitudinal flexibility and adjustability of the shape of the lower portion of blade 12 and of the die lip formed on its surface permits the use of fixed die lip elements, such as 24, which are not formed with a true straight edge. Due to the fact that the blade end portion 39 has a relatively high degree of flexibility, it may be brought into geometric conformity to the shape of the fixed blade 24 where this blade deviates considerably from a perfectly straight blade. For this purpose, a relatively thin, long, high blade, having points of longitudinal edge support at approximately one inch spacing from a fixed support element is preferred. Such spacing will, of course, vary with the length of the die and necessary degree of flexibility of the flexible blade.

A unique feature of this embodiment is that a film, which is uniform in its transverse dimensions to within ±3 percent, may be extruded from the die although neither the fixed nor the flexible die lips are straight to within this same degree. A deviation from a truly straight edge of 10 mils or more in a portion of a die may be compensated in this manner to produce a uniform cross section of the die opening. While such deviation is extreme for extrusion dies, the extrusion of wide film, for example, exceeding sixty inches in width, and at elevated temperatures, accompanied by differential thermal expansion, may result in deviations approaching this value. In order to achieve this extreme flexibility, the blade must be flexible about each point of support at the operating pressure of the die so that each single adjustment of a support point will result in a deflection of the blade predominantly at that point. The pressure of the fluid in contact with the die blade provides a restoring force for increasing the clearance between the die lips where such adjustment is necessary. For a die blade such as 12 of FIGURE 1, a deflection of 10 mils was accomplished by applying a force from one adjusting screw without substantially displacing the blade at points three inches on either side of the point of applied pressure.

Where a large separation of the die lip surfaces is desirable or needed, it is advantageous to incorporate the additional features shown in FIGURE 1. It will be understood that these features will desirably be incorporated in any of the modifications of the die shown or described herein.

These particular features have to do with the necessity for movement of the flex blade of the die. It will be appreciated that the die is operated at elevated temperatures and pressures and that the flex blade will be subjected to numerous stresses as a result. If, in addition to these stresses, the blade is put under stress due to its being moved and adjusted there is substantial danger that the blade itself may fail or that parts of the die construction used in flexing the blade will fail.

With reference now again particularly to FIGURE 1, it is seen that the thin portion 15 of the flex blade 12 is of uniform thickness over an extended portion of the section shown. This construction permits the blade 12 to be flexed over an extended useful lifetime without failure by avoiding concentration of flex stresses at a single point or small region of the blade.

Another feature of the construction of FIGURE 1 which insures a long useful life of the die under high temperature and high pressure operation which is normal for such die, is the die lip clearance adjustment structure. As is evident from FIGURE 1, the tip 38 of screw 28 is threaded into the end of 39 of flex blade 12. This assures positive adjustability both toward and away from the opposing lip.

The screw 28 is provided at the region next to the end portion 38 with a neck portion 37. This is a thinned section which provides flexibility of the bolt in the region where it may bend due to movement of end 39 of flex blade 12. As noted above this end portion may be rotated about the tip of bolt 38 which, in this respect, serves as a fulcrum support. It is also evident that, as the end 39 is moved back and forth to provide greater or smaller clearance between the lips, the blade end will swing through an arc around its upper point of support. This arc motion may be partially accommodated by a bending of the flexible neck 37 in the bolt 28.

In addition to this yieldable structure for extending the life of the clearance adjusting means, the spool 30 and the support member 14 are formed so as to accommodate a relatively small, but essential rocking of the bolt 28 at the surface where the spool flange is supported. As is evident from FIGURE 1, the internal flange surfaces of spool 30 are curved, thus any force tending to displace the bolt 28 and the spool 30 vertically, as a result of a horizontal adjustment of the bolt 28, will be accommodated by a rocking of the spool on the curved surface. Preferably the curvature of the internal flanges of spool 30 are such that rocking may occur both in the vertical and horizontal directions. This is preferred because of the distortion of the elements of the die which takes place as the device is heated and subjected to extrusion pressures.

As is also evident from FIGURE 1 the spool 30 is internally threaded so that the bolt 28 can be turned relative to the spool to adjust the clearance between the die lips. The adjustment is greatly facilitated in this way because the rocking of the spool in the plate 14 prevents the threads from binding due to the lateral or vertical movement of the bolt member 28 as the blade 12 is moved, or as the apparatus changes its shape under the heat and pressure of extrusion.

One further modification of the structure as shown in FIGURE 1 is advisable where additional longitudinal flexibility of the flex blade 12 is needed or desirable. This modification involves the vertical partial slitting of the thickened portion of the base 39 of the flex blade. Preferably one vertical slit is made midway between each pair of adjustment screws so that there are just about as many slits as there are screws. The slits are preferably cut to such a depth that the remaining thickness of metal at the base 39 is approximately equal to that in the thin section of the flex blade. Thus at the points where the slits occur the longitudinal flexing of the blade may occur with facility. At the same time the remaining thicker segments of metal may be moved substantially as a unit under the influence of the pressure exerted by the adjusting screw 28. This latter feature becomes more significant as the thickness of the base 39 of the flex blade is increased.

A further advantageous embodiment of extrusion apparatus is illustrated in FIGURE 3. In this modification, the screw 28 is disposed at an angle to the horizontal and its axis is aligned with the extrusion lip portion 39 of the flex blade 12. The screw member 28 is provided with a set screw 23 at its terminal end 38 in the flex blade 12. A clearance adjustment can be made simply by turning the hex head extension 32 of the spool 30. The elevation of the hex head above the terminal end 38 of the adjustment screw 28 makes it more readily accessible for use.

The fixed lip blade 24 is set in position by tightening suitable holding bolts, similar to bolts 26 (FIG. 1), which extend up through the lip blade 24 into the die body 10. An adjustment screw 25 is employed to make the initial adjustment of position of lip blade 24 just prior to the final tightening of the holding bolts. The adjusting screw 25 acts against a plate 27 which is held to the side of die body 10 by suitable bolts 29. The screws 25 are set in slots 31 in the plate 27. Flanges 43 on the bolt at either side of slot 31 prevent movement of the bolt relative to the plate 27. The threaded stud portion 33 of the bolt 25 imparts the adjusting force to the lip blade 24 responsive to rotation of the bolt.

An insulated jacket similar to element 42 in FIG. 1 may be provided over the top portions of the assembled die.

In the embodiment of extrusion apparatus shown in FIG. 4, the foregoing features are utilized in conjunction with advantageous modifications to yield an assembly which is highly preferred for excellent performance, durability and the ease and stability of operation.

A significant modification is the provision of the massive members, the die body member 10 and the support member 14, as an integral unit. The flexible die member 12 is secured between the said rigid members by means of threaded bolt 13, the tightening of which draws the wedge-shaped fixed portion 11 of blade 12 into engagement with the corresponding recess as shown. The result is an assembly displaying the desired rigidity and resistance to leakage of the composition being extruded throughout extended periods of operation.

The replaceable lip element 24 is securely held in a mating recess in element 10, having an accurately machined rectangular corner, by the tightening in turn of threaded bolt 29 and threaded bolt 26. The extrusion lip surface is preferably accurately machined as a smooth continuation of the die surface of body member 10.

Adjustment of the extrusion slot 22 is readily effected, as described above, by the relative rotation of the adjustment members 28 and 30, which may be provided evenly spaced two to three inches apart along the length of the extrusion die. As in the other embodiments, an outer jacket, such as 42 in FIG. 1, for heating or insulating the assembled extrusion apparatus may be provided over the upper portion.

As illustrative of the stability of control available in extrusion apparatus in accordance with this invention, polyethylene film of 1.5 thousandths of an inch thickness was extruded, using apparatus as shown in FIG. 4, at a rate of 53.5 feet of film per minute and the thickness was readily controlled within 5% of the desired value. On increase of the output to a rate of 169 feet of film per minute by increasing the extrusion pressure from 150 p.s.i. to about 550 p.s.i., the resulting film was found to retain the original average thickness of 1.5 mils as well as substantially the same variations therefrom.

In a further test of the stability of extrusion slot settings, a die assembly as shown in FIG. 4 was adjusted to extrude polyethylene film averaging 1.5 mils in thickness but with variations in thickness across the width of the film. The extrusion pressure was varied to produce film at linear rates of 53.5, 80, 134 and 169 feet per minute. Samples of film extruded at each rate were measured across the width on a micrograph and the resulting profiles were compared. Analysis showed that the thicker and thinner portions remained in the same relative positions across the width of the samples although the extrusion rate had been tripled and the extrusion pressure had been increased from 150 p.s.i. to about 550 p.s.i. Even at the highest extrusion rate and pressure, the extruded film was within acceptable commercial limits for gauge uniformity.

The excellent performance shown in such tests have been confirmed in extended periods of plant operation, wherein substantial uniformity of thickness across the width of the extruded film is maintained without requiring any extensive readjustment of the extrusion slot.

The present apparatus is advantageous for the extrusion of films of thermoplastic materials which are converted on heating to elevated temperatures to viscous liquids. Likewise, viscous aqueous and non-aqueous solutions may advantageously be extruded as film, for example, viscose or cupraammonium cellulose solutions for the manufacture of regenerated cellulose, as well as colloidal solutions of cellulose esters or ethers or of vinyl resins in volatile organic solvents. The apparatus is particularly preferred in the extrusion of polyolefines such as polyethylene, polypropylene or co-polymers, polystyrene, vinyl polymers, or vinylidene chloride copolymers. Likewise, thermoplastic polyesters are readily extruded to film thereby.

As the parts are free of complex shapes, they are readily and rapidly prepared by conventional fabricating procedures and may be assembled and disassembled with outstanding facility.

The provision of a single massive and rigid die body member, a single flexible die wall member and a single massive and rigid support member results in an exceptionally rugged assembly. In the described embodiments, the flexible wall member is more prone to wear and tear than the other parts and is readily replaceable. The extrusion lip portion of the rigid die body member is more subject to wear than the other parts thereof, and this part is desirably a readily replaceable one, as shown. With the provision of adjustability of this part, as best shown in the embodiment of FIG. 3, the slot can be preset at about the desired value with the adjusting means for the flexible blade at about its median setting. This facilitates and minimizes the adjustments required at operating conditions.

The novel adjustment means shown and described for the desired backward or forward movement of the flexible blade provide the advantages of simple construction and ruggedness, combined with ease of operation even under operating conditions involving high pressure, elevated temperatures or both.

As modifications will be readily apparent to those skilled in the art, the invention is not to be considered as limited to the illustrative details disclosed above, except as specified in the appended claims.

We claim:
1. In film extrusion apparatus having a rigid wall member, a rigid support member, and secured between the said members near one end thereof a flexible wall member, the said members having a free end opposite the said end, and wherein the said wall members define a die cavity terminated by a pair of lips,
   a combination of elements adapted for the extrusion of film of substantially uniform thickness, comprising:
   a replaceable lip element secured to the rigid wall member at its free end,
   said lip element being opposed to and spaced from the free end of the flexible wall member constituting a second lip,
   and means for adjustably spacing the second lip from the first lip,
   said means including internally threaded spools rotatably mounted in slots spaced along the free end of the said support member, each of said spools having a pair of opposed curved flange surfaces bearing on the said support member, and a screw member threaded within each said spool and threadedly attached to the free end of the said flexible wall member, whereby the relative rotation of a spool and its screw member effects the movement of the second lip with respect to the first lip to accomplish the desired spacing thereof.

2. Film extrusion apparatus in accordance with claim 1, wherein the said die cavity is unsymmetrical.

3. Film extrusion apparatus in accordance with claim 1, wherein the said flexible wall member has a tapered fixed end secured within a corresponding recess between the said rigid members.

4. In film extrusion apparatus having a rigid wall member and adjacent thereto a flexible wall member, with the said members defining a die cavity terminated by a pair of opposed lips, the combination of a rigid support member adjacent to the said flexible wall member and secured thereto at one end, internally threaded spools rotatably mounted in slots spaced along the free end of the said support member, each of said spools having a pair of opposed curved flange surfaces bearing on the said support member, and a screw member threaded within each said spool and threadedly attached to the free end of the said flexible wall member, whereby the relative rotation of a spool and its screw member effects the movement of one lip with respect to the other to accomplish the desired spacing thereof.

5. In film extrusion apparatus having a rigid wall member, a rigid support member, and secured between the said members near one end thereof a flexible wall member, the said members having a free end opposite the said end, and wherein the said wall members define a die cavity terminated by a pair of lips,
   means for adjustably spacing the said lips, comprising spools rotatably mounted in slots spaced along the free end of the said support member,
   each of said spools being internally threaded and having a pair of opposed curved flange surfaces bearing on the said support member,
   and a screw member threaded within each spool and threadedly attached to the free end of the said flexible wall member.

References Cited in the file of this patent
UNITED STATES PATENTS

| | | |
|---|---|---|
| 2,175,961 | Kampfer | Oct. 10, 1939 |
| 2,686,931 | Knox | Aug. 24, 1954 |
| 2,765,492 | Velvel | Oct. 9, 1956 |
| 2,923,971 | Nelson | Feb. 9, 1960 |